United States Patent
Damnjanovic et al.

(10) Patent No.: US 8,634,358 B2
(45) Date of Patent: Jan. 21, 2014

(54) METHOD AND APPARATUS FOR MULTICARRIER CONTROL IN A WIRELESS COMMUNICATION SYSTEM

(75) Inventors: Jelena M. Damnjanovic, Del Mar, CA (US); Juan Montojo, San Diego, CA (US); Naga Bhushan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 12/764,693

(22) Filed: Apr. 21, 2010

(65) Prior Publication Data

US 2011/0096735 A1 Apr. 28, 2011

Related U.S. Application Data

(60) Provisional application No. 61/172,156, filed on Apr. 23, 2009.

(51) Int. Cl.
*H04W 4/00* (2009.01)

(52) U.S. Cl.
USPC ........................................... 370/329

(58) Field of Classification Search
USPC ........................................... 370/329
See application file for complete search history.

(56) References Cited

U.S. PATENT DOCUMENTS

2010/0118803 A1   5/2010   Ishii et al.
2010/0220675 A1*  9/2010   Chun et al. ............. 370/329
2011/0305134 A1* 12/2011   Chung et al. ........... 370/216

FOREIGN PATENT DOCUMENTS

KR   20090039578 A   4/2009
WO   2008120544 A1  10/2008

OTHER PUBLICATIONS

3rd Generation Partnership Project (3GPP), 3rd Generation Partnership Project, Technical Specification Group Radio Access Network, Evolved Universal Terrestrial Radio Access (E-UTRA), Physical Channels and Modulation (Release 8) 3GPP Standard, 3GPP TS 36.211 V8.5.0, Dec. 1, 2008, pp. 1-82, XP050377537.
International Search Report and Written Opinion—PCT/US2010/032285, International Search Authority—European Patent Office—Mar. 7, 2011.
Motorola: "Control Signaling Design for Supporting Carrier Aggregation" 3GPP Draft; R1-090792, 3rd Generation Partnership Project (3GPP), Feb. 3, 2009, p. 8PP, XP050318649.
Samsung, "PHICH Transmission in LTE-A" Draft, R1-091237, 3rd Generation Partnership Project (3GPP), Mar. 18, 2009, pp. 1-3, XP002622184.
Texas Instruments, "Downlink and Uplink Control to Support Carrier Aggregation" Draft, R1-091295, 3rd Generation Partnership Project (3GPP), Mar. 18, 2009, pp. 1-5, XP002622183.
Taiwan Search Report—TW099113060—TIPO—Feb. 19, 2013.

* cited by examiner

*Primary Examiner* — Hassan Kizou
*Assistant Examiner* — Ashil Farahmand
(74) *Attorney, Agent, or Firm* — Paul Kuo

(57) ABSTRACT

The described apparatus and methods may include a controller configured to generate a grant for at least one carrier for transmission on one of a plurality of carriers, and generate feedback for transmission on the one of the plurality of carriers.

56 Claims, 11 Drawing Sheets

METHOD AND APPARATUS FOR MULTICARRIER CONTROL IN A WIRELESS COMMUNICATION SYSTEM

CLAIM OF PRIORITY UNDER 35 U.S.C. §119

The present application for Patent claims priority to Provisional Application No. 61/172,156 entitled "METHOD AND APPARATUS FOR MULTICARRIER CONTROL IN A WIRELESS COMMUNICATION SYSTEM" filed Apr. 23, 2009, and assigned to the assignee hereof and hereby expressly incorporated by reference herein.

BACKGROUND

1. Field

The present disclosure relates generally to wireless communication systems. More specifically, the present disclosure relates to a method and apparatus for multicarrier control in a wireless communication system.

2. Introduction

Wireless communication systems are widely deployed to provide various communication services such as voice, video, packet data, messaging, broadcast, etc. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, orthogonal Frequency Division Multiple Access (OFDMA) systems, and Single-Carrier FDMA (SC-FDMA) systems.

In communication systems where multiple uplink and downlink carriers are present, certain rules should be defined specifying feedback regarding acknowledgement of received data. While in LTE Release 8 there may be only one uplink paired with one downlink, and the feedback of the uplink transmission is sent on the corresponding downlink carrier on a physical feedback channel, such a solution is inapplicable to multicarrier systems (e.g., LTE-Advanced) having asymmetric uplink and downlink configurations.

Accordingly, there exists a need in the art for a method and apparatus that control multicarrier HARQ feedback in asymmetric multicarrier systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a wireless communication apparatus may include a controller configured to generate a grant for at least one carrier for transmission on one of a plurality of carriers, and generate feedback for transmission on the one of the plurality of carriers.

According to another aspect of the disclosure, a method for wireless communication may include generating a grant for at least one carrier for transmission on one of a plurality of carriers, and generating feedback for transmission on the one of the plurality of carriers.

According to a further aspect of the disclosure, an apparatus may include means for generating a grant for at least one carrier for transmission on one of a plurality of carriers, and means for generating feedback for transmission on the one of the plurality of carriers.

According to yet a further aspect of the disclosure, a computer program product may include a computer-readable medium including code for generating a grant for at least one carrier for transmission on one of a plurality of carriers, and code for generating feedback for transmission on the one of the plurality of carriers.

According to yet a further aspect of the disclosure, a wireless communication apparatus may include a controller configured to receive a grant for at least one carrier on one of a plurality of carriers, and determine which one of the plurality of carriers to receive feedback on based on which one of the plurality of carriers the grant was received on.

According to yet a further aspect of the disclosure, a method for wireless communication may include receiving a grant for at least one carrier on one of a plurality of carriers, and determining which one of the plurality of carriers to receive feedback on based on which one of the plurality of carriers the grant was received on.

According to yet a further aspect of the disclosure, an apparatus may include means for receiving a grant for at least one carrier on one of a plurality of carriers, and means for determining which one of the plurality of carriers to receive feedback on based on which one of the plurality of carriers the grant was received on.

According to yet a further aspect of the disclosure, a computer program product may include a computer-readable medium including code for receiving a grant for at least one carrier on one of a plurality of carriers, and code for determining which one of the plurality of carriers to receive feedback on based on which one of the plurality of carriers the grant was received on.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
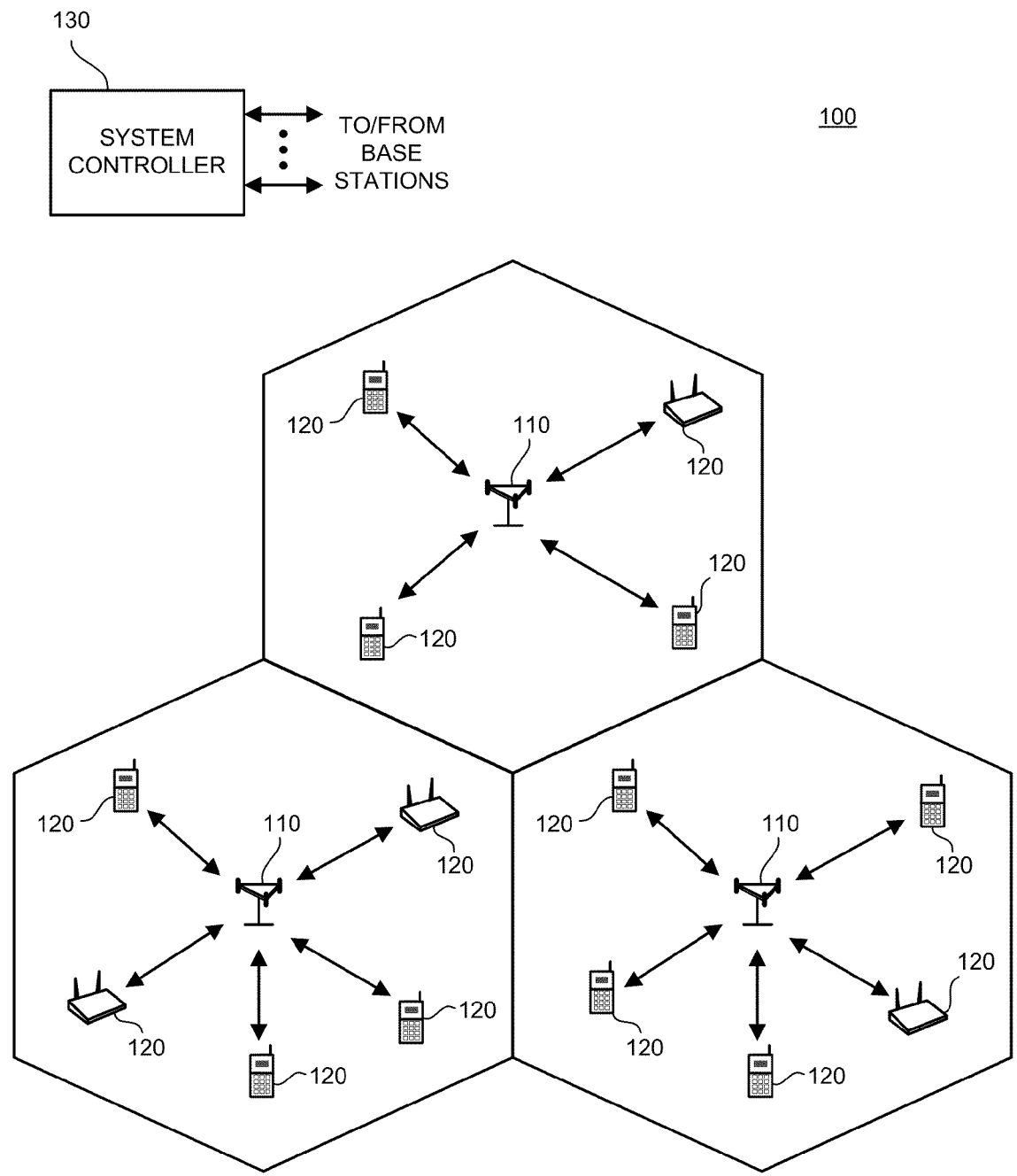
FIG. 1 illustrates aspects of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

FIG. 1 shows a wireless communication system 100, which may be a 3GPP LTE E-UTRA system. System 100 may include base stations 110 and other network entities described by 3GPP. A base station may be a fixed station that communicates with the access terminals. Each base station 110 may provide communication coverage for a particular geographic area. To improve network capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area.

A system controller 130 may include a mobility management entity (MME) and a serving gateway (S-GW), and may couple to a set of base stations and provide coordination and control for these base stations. S-GW may support data services such as packet data, Voice-over-Internet Protocol (VoIP), video, messaging, etc. MME may be responsible for path switching between a source base station and a target base station at handover. System controller 130 may couple to a core and/or data network (e.g., the Internet) and may communicate with other entities (e.g., remote servers and terminals) coupled to the core/data network.

Access terminals 120 may be dispersed throughout the network, and each access terminal may be stationary or mobile. An access terminal may communicate with a base station via downlink and uplink. The downlink (or forward link) refers to the communication link from the base station to the access terminal, and the uplink (or reverse link) refers to the communication link from the access terminal to the base station. In FIG. 1, a solid line with double arrows indicates active communication between a base station and an access terminal.

Figure 2:
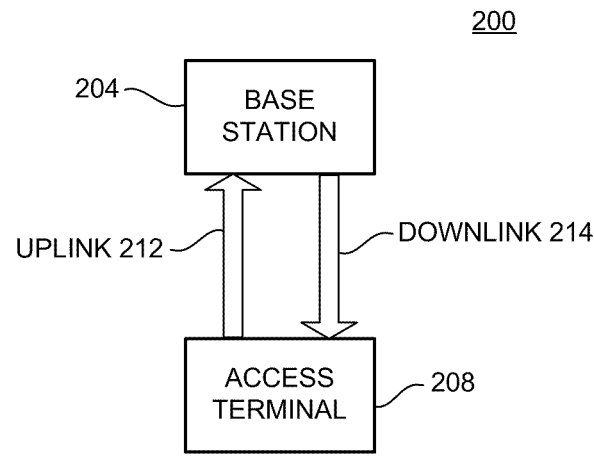
FIG. 2 illustrates a communications system including an uplink and a downlink between a base station and an access terminal.

FIG. 2 illustrates a system 200 including an uplink 212 and a downlink 214 between a base station 204 and an access terminal 208. The base station 204 and the access terminal 208 may correspond to the base station 110 and the access terminal 120 shown in FIG. 1. The uplink 212 refers to transmissions from the access terminal 208 to the base station 204; and the downlink 214 refers to transmissions from the base station 204 to the access terminal 208.

Figure 3:
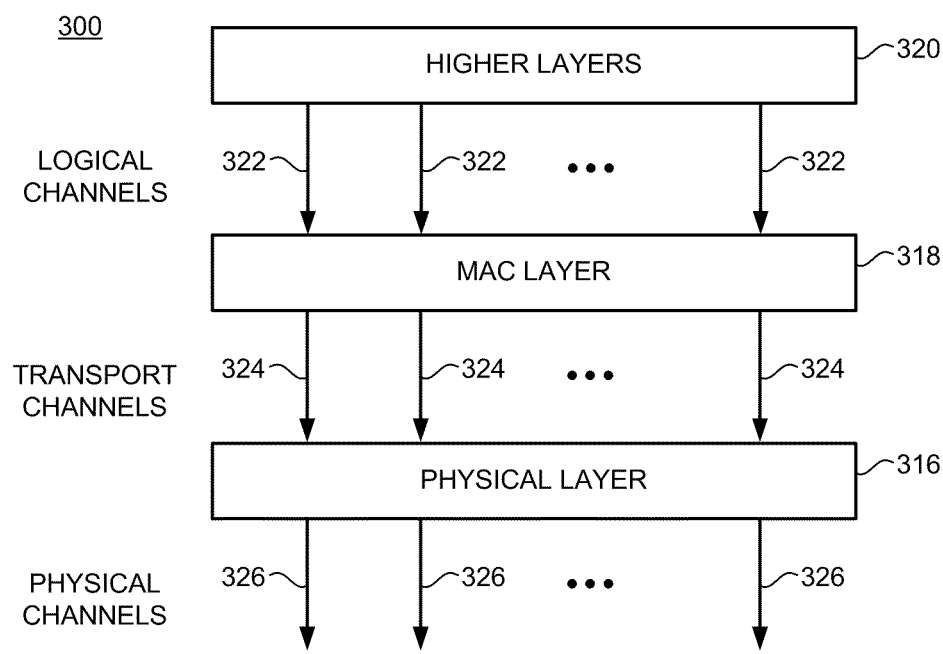
FIG. 3 illustrates some aspects of a protocol stack for a communications system.

FIG. 3 illustrates some aspects of a protocol stack for a communications system. Both, the base station 204 and the access terminal 208 may include the protocol stack 300 illustrated in FIG. 3. The protocol stack may include a physical layer (PHY) 316, a Medium Access Control (MAC) 318, and higher layers 320.

The MAC layer 318 may receives data from the higher layers 320 via one or more logical channels 322. The MAC layer 318 may then perform various functions such as mapping between logical channels 322 and transport channels 324, multiplexing and demultiplexing of various PDUs for logical channels 322 into/from transport blocks for transport channels 324, error correction through Hybrid Automatic Repeat Request (HARM), traffic volume measurement reporting, priority handling between logical channels 322 of an access terminal, priority handling between access terminals via dynamic scheduling, transport format selection, padding, etc.

The physical layer 316 may be configured to provide multiple physical control channels 326. The access terminal 204 may be configured to monitor this set of control channels. The physical layer 316 may also offer data transport services via the physical channels 326. Some the physical channels for downlink signal transmissions may be Physical Downlink Control Channel (PDCCH), Physical Hybrid ARQ Indicator Channel (PHICH), and Physical Downlink Shared Channel (PDSCH). Some of the physical channels for uplink signal transmissions may be Physical Uplink Control Channel (PUCCH), Physical Uplink Shared Channel (PUSCH), and Physical Random Access Channel (PRACH).

Figure 4:
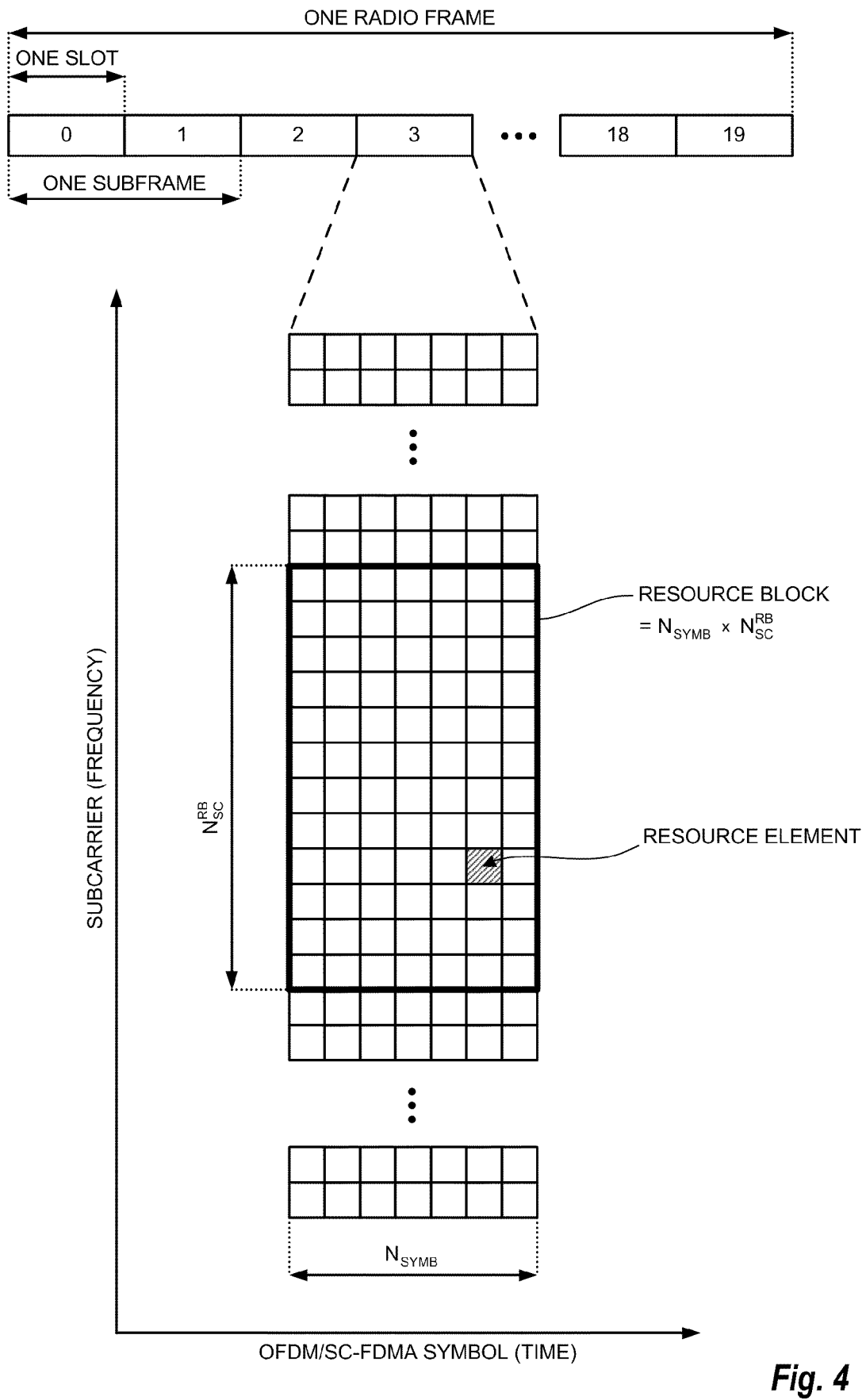
FIG. 4 illustrates a radio frame structure and a resource grid showing a resource block and resource elements.

The system 100 may use orthogonal OFDMA for the downlink and SC-FDMA for the uplink. The basic idea underlying OFDM is the division of the available frequency spectrum into several subcarriers. To obtain a high spectral efficiency, the frequency responses of the subcarriers are overlapping and orthogonal. In the system 100, the OFDMA downlink transmissions and the uplink transmissions may be organized into radio frames with a 10 ms duration. The frame structure may be applicable to both frequency division duplex (FDD) (the application of frequency-division multiplexing to separate outward and return signals) and time division duplex (TDD) (the application of time-division multiplexing to separate outward and return signals). As shown in FIG. 4, each radio frame is 10 ms long and consists of 20 slots of 0.5 ms, numbered from 0 to 19. A subframe is defined as two consecutive slots where subframe i consists of slots $2i$ and $2i+1$. The subframe may be referred to as a transmission time interval (TTI). For FDD, 10 subframes are available for downlink transmission and 10 subframes are available for uplink transmissions in each 10 ms interval. Uplink and downlink transmissions are separated in the frequency domain. For TDD, a subframe is either allocated to downlink or uplink transmission. Subframe 0 and subframe 5 may always be allocated for downlink transmission.

The signal in each slot may be described by a resource grid of $N_{SC}^{RB}$ subcarriers and $N_{SYMB}$ symbols, which may be OFDM symbols for downlink or SC-FDMA symbols for uplink. In case of multi-antenna transmission from the base station 110, there may be one resource grid defined per antenna port. An antenna port may be defined by a downlink reference signal (DLRS) that is unique within the cell. Each element in the resource grid for an antenna port p may be called a resource element and is uniquely identified by the index pair (k,l) where k and l are the indices in the frequency and time domains, respectively. One, two, four, or more antenna ports may be supported. A physical resource block may be defined as $N_{SYMB}$ consecutive symbols in the time domain and $N_{SC}^{RB}$ (e.g., 12) consecutive subcarriers in the frequency domain. A resource block thus consists of $N_{SYMB} \times N_{SC}^{RB}$ resource elements.

Data transmitted over the system 100 may be categorized as either non-real-time (NRT) data or real-time (RT) data. Examples of NRT data include data transmitted during web browsing by an access terminal or text-messaging to an access terminal, while an example of RT data is voice communication between access terminals.

Data packets (both NRT and RT) are transmitted from the base station to the access terminals in the PDSCH. Various modulation and coding schemes (MCSs) are supported on the PDSCH. Modulation schemes include quadrature phase-shift keying (QPSK) and quadrature amplitude modulation (QAM), such as 16-QAM and 64-QAM. Various coding rates, used for error correction, may be used. The combination of modulation schemes and coding rates may result in a large number, e.g., 30, of possible MCSs.

Uplink and downlink control signaling from the base station may be transmitted in the PDCCH and the PHICH. The PDCCH downlink control signaling includes resource scheduling information. The PHICH may be used to indicate to an access terminal on a downlink whether an uplink packet was correctly received at the base station via HARQ feedback. HARQ refers to a combined technology of an Automatic Repeat Request (ARQ) technology and a Forward Error Correction (FEC) technology.

ARQ refers to a technology in which a transmitter assigns sequence numbers to data packets according to a predetermined scheme and transmits the data packets, and a receiver requests the transmitter to retransmit missing packet(s) among the received packets using the sequence numbers, thereby achieving reliable data transmission. FEC refers to a technology for adding redundant bits to transmission data before transmission like the convolutional coding or turbo coding, to cope with an error occurring in the noise or fading environment that happens in the data transmission/reception process, thereby decoding the originally transmitted data.

In a system using HARQ, a receiver decodes received data through an inverse FEC process, and determines if the decoded data has an error through Cyclic Redundancy Check (CRC) check. If there is no error, the receiver feeds back ACK to the transmitter, so that the transmitter can transmit the next data packet. However, if there is an error, the receiver feeds back NACK to the transmitter, thereby requesting retransmission of the previously transmitted packet. Through this process, the receiver combines the previously transmitted packet with the retransmitted packet, thereby obtaining energy gain and improved reception performance.

When scheduling resources, the base station may transmit a scheduling grant on the PDCCH that grants to a particular access terminal an amount of physical resources in the downlink and/or the uplink. For an uplink scheduling grant, this amount of physical resources is constructed of a number of uplink resource blocks. The base station may then transmit an ACK or NACK as appropriate to the access terminal once that granted set of uplink resource blocks passes so the access terminal can know whether or not it must re-transmit its uplink data.

Figure 5:
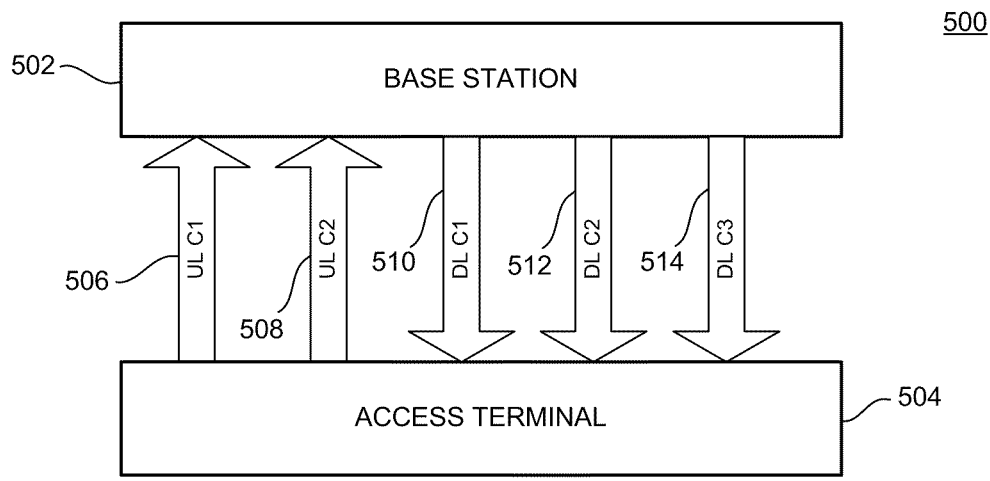
FIG. 5 illustrates an example of an asymmetric multicarrier system.

FIG. 5 illustrates a multicarrier system 500 including uplink carriers UL C1 506, UL C2 508 and downlink carriers DL C1 510, DL C2 512, DL C3 514 between a base station 502 and an access terminal 504. The base station 502 and the access terminal 504 may correspond to the base station 110 and the access terminal 120 shown in FIG. 1. The system 500 is asymmetric in the sense that the number of uplink carriers 506, 508 is not equal to the number of downlink carriers 510, 512, 514. Although only two uplink carriers and three downlink carriers are shown, the system 500 may be configured to include any number of uplink and downlink carriers. Furthermore, the system 500 may include a number of uplink carriers greater than a number of downlink carriers and vice versa.

The system 500 is further configured to support carrier pairing between the uplink and downlink carriers. The pairing can be between one or more downlink carriers and one or more uplink carriers. In one configuration, at least one downlink carrier is paired with a plurality of uplink carriers or a plurality of downlink carriers are paired with at least one uplink carrier, such that the pairing group of downlink and uplink carriers contains at least three carriers.

Figure 6:
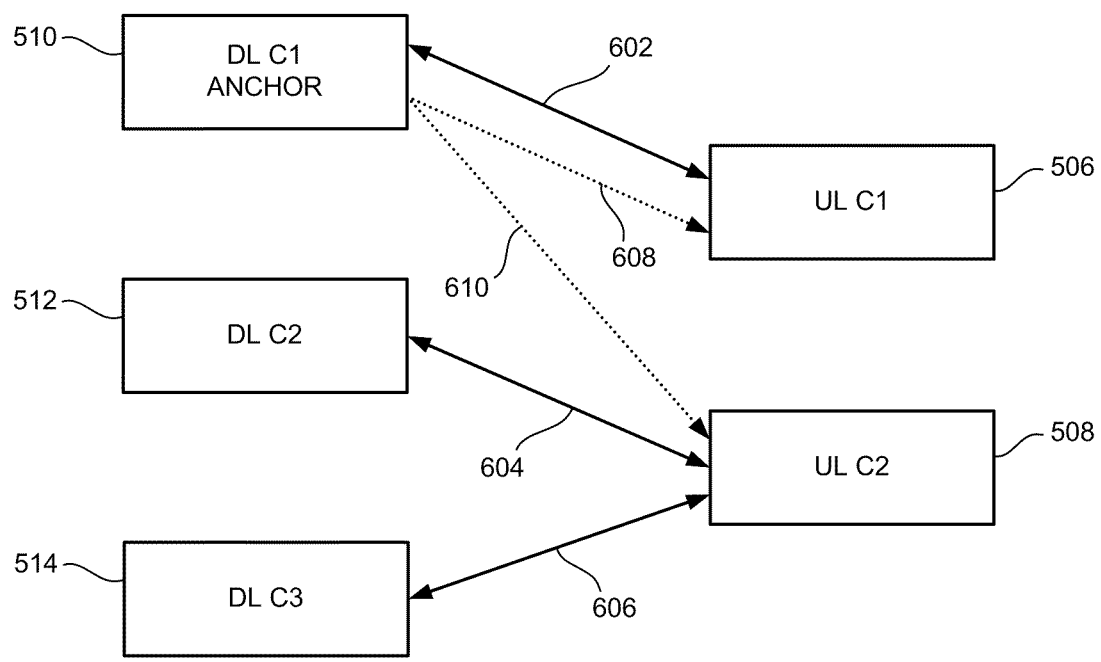
FIG. 6 illustrates an example of uplink/downlink pairing with an anchor carrier.

FIG. 6 shows is a block diagram illustrating an example of downlink/uplink carrier pairing for the system 500. As shown in FIG. 6, UL C1 506 may be paired with DL C1 510 (shown with solid arrow 602), and UL C2 508 may be paired with DL C2 512 and DL C3 514 (shown with solid arrows 604, 606). UL C1 506 may carry uplink control information for DL C1 510, and UL C2 508 may carry uplink control information for DL C2 512 and DL C3 514. The uplink control information may include downlink HARQ feedback and Channel Quality Indicator (CQI) feedback. Similarly, the DL C1 may carry downlink control information for UL C1 506, and DL C2 512 and DL C3 514 may carry downlink control information for UL C2 508. The downlink control information may include uplink HARQ feedback, and uplink grants.

Carrier pairing can be semi-static or dynamic as determined by the base station 110. For semi-static pairing, the base station 110 can notify all the access terminals 120 of the pairing by broadcasting the system information in a system information block (SIB). Alternatively, the base station 110 can inform each access terminal 120 of the pairing with a dedicated signaling through radio resource control (RRC) signaling in an RRC connection setup message. For dynamic pairing, the base station 110 can notify the access terminals 120 of the pairing through MAC signaling included in the grant message.

The carrier on which control information is sent may also depend on whether there are any designated anchor carriers. If an anchor carrier is present in the system, control information may be sent on the anchor carrier for one or more of the corresponding carriers, even if the carriers are outside the pairing. For example, if DL C1 510 may be designated as the anchor carrier for the downlink carriers 510, 512, 514, and UL C1 506 may be designated as the anchor carrier for the uplink carriers 506, 508, then UL C1 506 would carry control information for downlink carriers 510, 512, 514, and DL C1 510 would carry control information for uplink carriers 506, 508.

One or more anchor carriers can be defined for each of the uplink carriers and the downlink carriers. The base station 110 may notify the access terminals 120 of an anchor carrier in an SIB or through a dedicated signaling such as RRC signaling. The base station 110 notifies access terminals 120 of the uplink/downlink pairing and any anchor carriers in SIBs. The SIBs may include carrier locations (i.e., carrier center frequencies), carrier bandwidths, carrier designation (uplink/downlink), carrier pairing, and anchor carrier information, as well as on which specific carrier and resources to expect HARQ feedback. In one configuration, some of the control information may be sent through the anchor carrier and other control information may be sent through the paired carrier. For example, the base station 110 could indicate with a flag through a broadcast or RRC signaling whether the uplink HARQ feedback should be sent on a paired downlink carrier or the designated downlink anchor carrier.

As discussed with reference to FIG. 5, it may be possible to have multiple uplink and downlink carriers with a symmetric or an asymmetric configuration. Therefore, it may be desirable to adopt a feedback approach that is transparent to the uplink/downlink carrier asymmetry and pairing. The asymmetry may not necessarily be due to carrier configuration but may also be a result of a configuration of an access terminal (e.g. due to specific interference conditions).

According to an aspect, uplink HARQ feedback on the downlink PHICH may be transmitted on the downlink carrier on which the uplink grant was sent, regardless of the uplink/downlink pairing. Such a scheme is transparent to the uplink/downlink carrier asymmetry. Different access terminals may have different anchor carriers, and thus, overloading of one carrier is not expected. Having the PHICH sent on the same anchor downlink carrier as the uplink grant is beneficial since the anchor carrier is the interference protected carrier in heterogeneous networks that provides good control channel reliability.

For example, as shown in FIG. 6, a multicarrier uplink grant for UL C1 506 and UL C2 508 may be transmitted from the base station 502 to the access terminal 504 on anchor carrier DL C1 510, as indicated by dashed arrows 608 and 610. As an alternative to the multicarrier uplink grant, the base station 502 may transmit separate uplink grants using different Radio Network Temporary Identifiers (RNTIs) for each uplink carrier UL C1 506 and UL C2 508 on the anchor carrier DL C1 510, or transmit separate uplink grants using explicit bit fields to identify each uplink carrier UL C1 506 and UL C2 508 on the anchor carrier DL C1 510. The anchor carrier DL C1 510 may then be used exclusively to transmit HARQ feedback for UL C1 506 and UL C2 508 because it is the downlink carrier on which the uplink grants were transmitted. When utilizing the anchor DL C1 510 for transmission of all uplink grants, the base station 502 may be configured to reserve all of the required PHICH resources within a control region of the anchor DL C1 510 in order to accommodate for all uplink HARQ transmissions.

PHICH mapping based on the grant transmission may result in multiple uplink carriers being mapped to one downlink carrier. This case may occur either when the cross-carrier operation is enabled (resources for multiple uplink carriers assigned through multiple single carrier grants sent on one downlink carrier) or in the asymmetric uplink/downlink carrier configuration when the number of uplink carriers is larger than the number of downlink carriers.

In order to maintain backwards compatibility with LTE (e.g., 3GPP Release 8) access terminals, while serving LTE-A access terminals, uplink resource indexing for the purpose of PHICH resource determination may start from the uplink carrier that is paired with the corresponding downlink carrier. For example, the base station 502 may be configured to assign to the LTE access terminals only the uplink carrier that is paired with the corresponding downlink carrier. If there is more than one uplink carrier paired with the same downlink carrier, the base station 502 may be configured to assign the additional uplink carriers to the LTE-A access terminals.

The indexing may continue cyclically for other carriers applicable to the LTE-A access terminals. The indexing may be performed system-wide, taking into account all uplink carriers that could be assigned by the grant sent across the specific downlink carrier. The indexing may not be based on a configuration that is specific to an access terminal. LTE-A access terminals may be configured for only a subset of carriers, but the uplink resource blocks may be determined based on the system configuration. LTE-A access terminals may use the subset of the PHICH resources corresponding to their assigned uplink carriers.

For example, the base station 502 may be configured to reserve PHICH resources on the anchor DL C1 510 for both, LTE and LTE-A access terminals, and reserve PHICH resources on the DL C2 512 only for LTE access terminals. In particular, if the number of resource blocks on UL C1 506 is $N_{RB1}$ and the number of resource blocks on UL C2 508 is $N_{RB2}$, then the PHICH resources on anchor DL C1 510 that correspond to the resource blocks numbered 1 to $N_{RB1}$ may be assigned to carry HARQ feedback for UL C1 506, and the PHICH resources that correspond to the resource blocks numbered $N_{RB1}+1$ to $N_{RB1}+N_{RB2}$ may be assigned to carry HARQ feedback for UL C2 508. PHICH resources on DL C2 512 that correspond to the resource blocks numbered 1 to $N_{RB2}$ may be assigned to carry HARQ feedback for UL C2 508, and may be reserved for LTE access terminals since the PHICH resources for LTE-A access terminals have already been reserved on anchor DL C1 510. Other PHICH resources on anchor DL C1 510 that correspond to resource blocks numbered $N_{RB2}+1$ to $N_{RB1}+N_{RB2}+N_{RBX}$ may be assigned to carry HARQ feedback for any additional uplink carrier X having $N_{RBX}$ resource blocks, and so on. Assigning resources in this manner may avoid overlap of PHICH resources for uplink carriers 506 and 508 and ensure that anchor DL C1 510 will accommodate all uplink HARQ transmissions for both LTE and LTE-A access terminals. If more PHICH resources are required, PDCCH Control Channel Elements (CCEs) or data resource blocks may be used.

Figure 7:
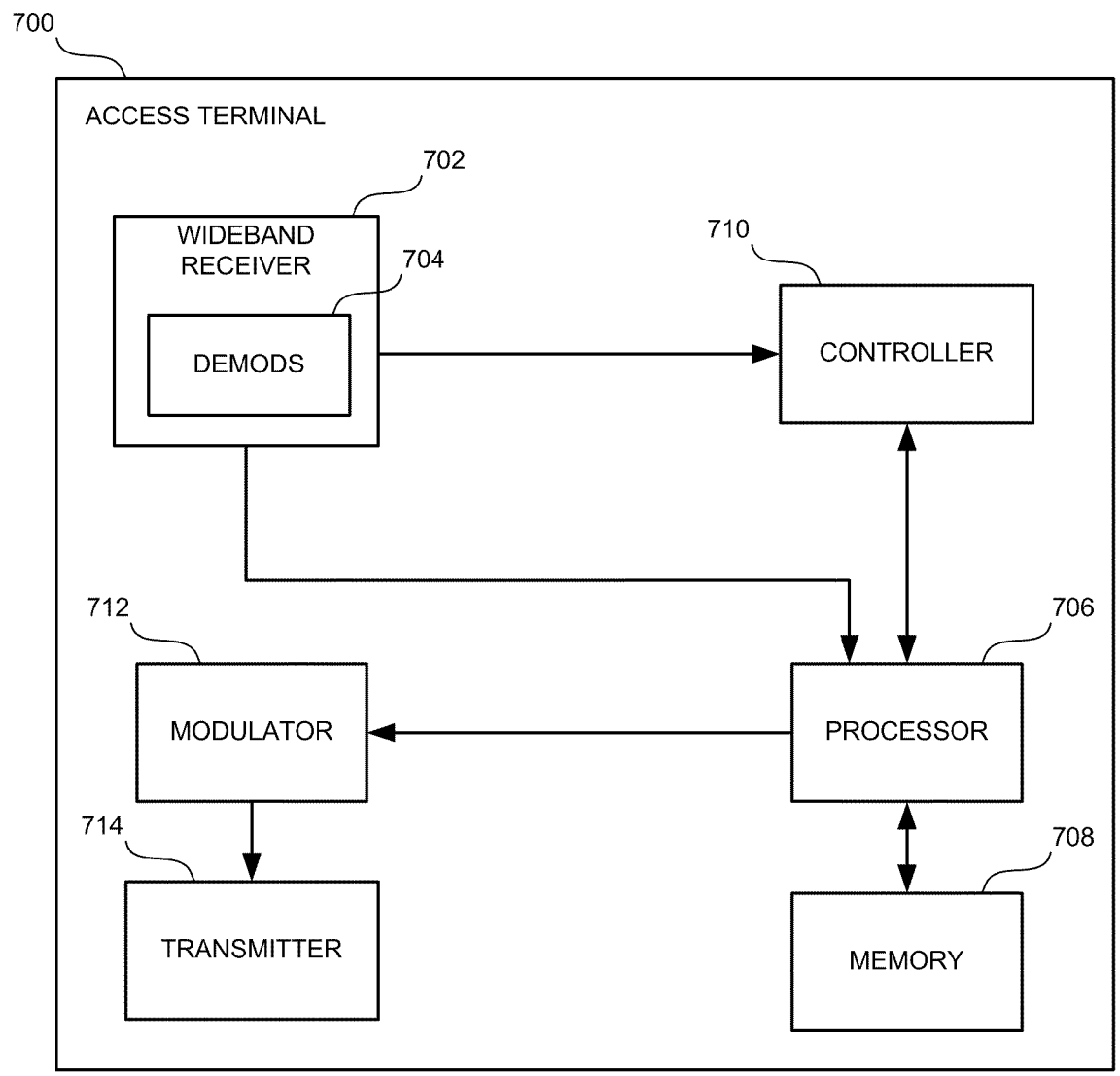
FIG. 7 illustrates an example of an access terminal that controls feedback in an asymmetric multicarrier communications system.

FIG. 7 is an illustration of an access terminal that controls feedback in an asymmetric multicarrier communications system. The access terminal 700 may correspond to the one of the access terminals 120 shown in FIG. 1. As shown in FIG. 7, the access terminal 700 may include a receiver 702 that receives multiple signals from, for instance, one or more receive antennas (not shown), performs typical actions on (e.g., filters, amplifies, downconverts, etc.) the received signals, and digitizes the conditioned signals to obtain samples. The receiver 702 may include a plurality of demodulators 704 that can demodulate received symbols from each signal and provide them to a processor 706 for channel estimation, as described herein. The processor 706 can be a processor dedicated to analyzing information received by the receiver 702 and/or generating information for transmission by a transmitter 716, a processor that controls one or more components of the access terminal 700, and/or a processor that both analyzes information received by the receiver 702, generates information for transmission by the transmitter 716, and controls one or more components of the access terminal 700.

The access terminal 700 may additionally include memory 708 that is operatively coupled to the processor 706 and that can store data to be transmitted (e.g., high priority data), received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

The receiver 702 can further be operatively coupled to a controller 710 that can control HARQ feedback by determining the downlink carrier to receive feedback on based on where the uplink grant was received, allocate PHICH resources for HARQ feedback, control the acquisition and storage in memory 708 of the grant data and HARQ feedback, and direct communications with the base station by interfacing with transmitter 714 via the processor 706, as discussed with reference to FIG. 1. The access terminal 700 still further comprises a modulator 712 that modulates and transmits signals via transmitter 714 to, for instance, a base station, a web/internet access point name (APN), and another access terminal, etc. Although depicted as being separate from the processor 706, it is to be appreciated that the controller 710, demodulators 704, and/or modulator 712 can be part of the processor 706 or multiple processors (not shown). Furthermore, the functions of the controller 710 may be integrated in an application layer, a data stack, an HTTP stack, at the operating system (OS) level, in an internet browser application, or in an application specific integrated circuit (ASIC).

Figure 8:
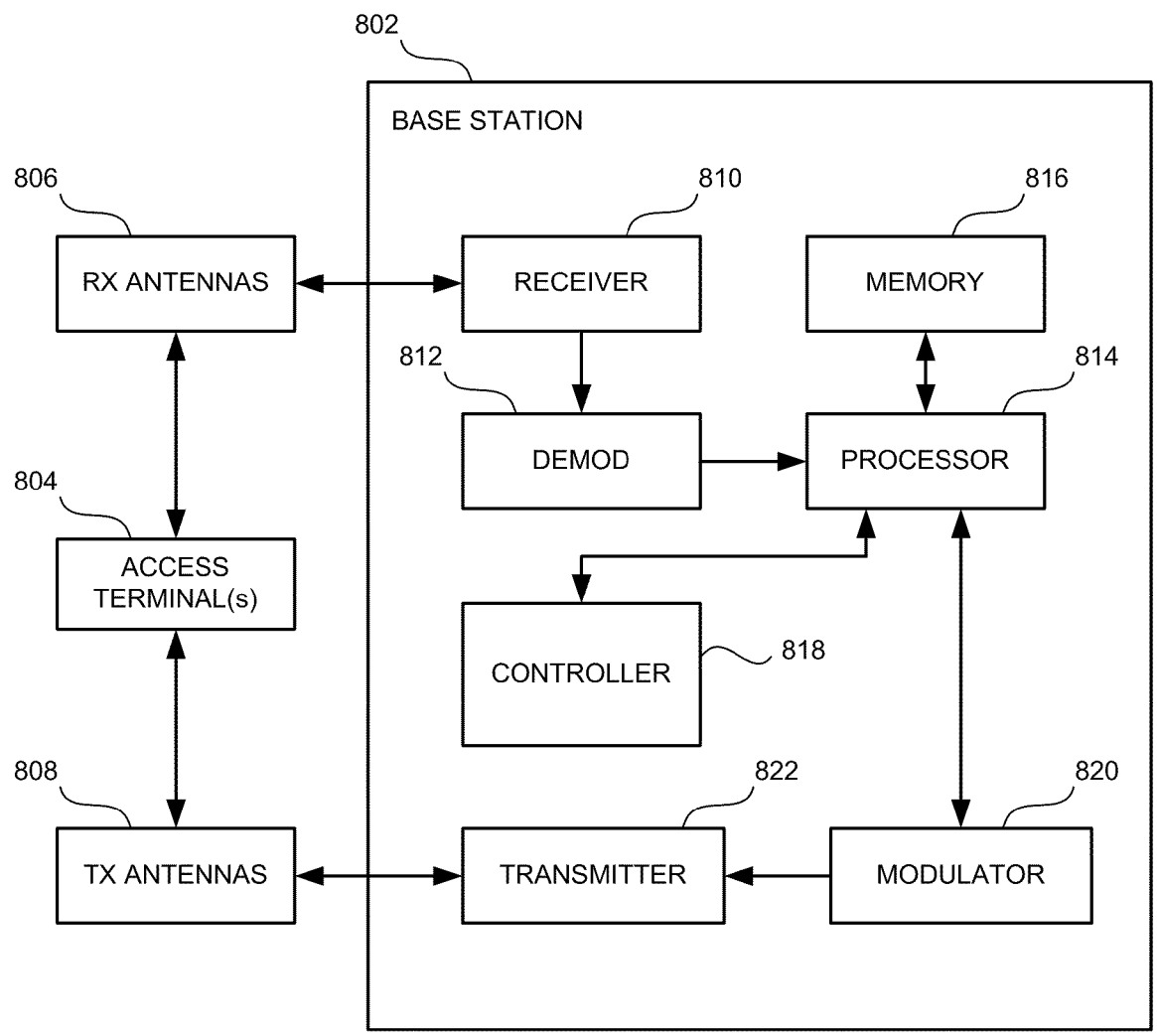
FIG. 8 is a block diagram of an example base station that controls feedback in an asymmetric multicarrier communications system.

FIG. 8 is an illustration of a system 800 that controls feedback in an asymmetric multicarrier communications system. The system 800 comprises a base station 802 (e.g., access point, femtocell, etc.) with a receiver 810 that receives signal(s) from one or more access terminals 804 through a plurality of receive antennas 806, and a transmitter 824 that transmits to the one or more access terminals 804 through a transmit antenna 808. Receiver 810 can receive information from receive antennas 806 and is operatively associated with a demodulator 812 that demodulates received information. Demodulated symbols are analyzed by a processor 814 that can perform some or all functions for the base station 808 described above with regard to FIG. 1, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a controller 818 that can control HARQ feedback by generating grants and feedback, and determining the downlink carrier to transmit feedback on based on where the uplink grant was transmitted to the access terminal 804, and allocate PHICH resources for HARQ feedback. Although depicted as being separate from the processor 814, it is to be appreciated that the controller 818, demodulator 812, and/or modulator 820 can be part of the processor 814 or multiple processors (not shown).

Figure 9:
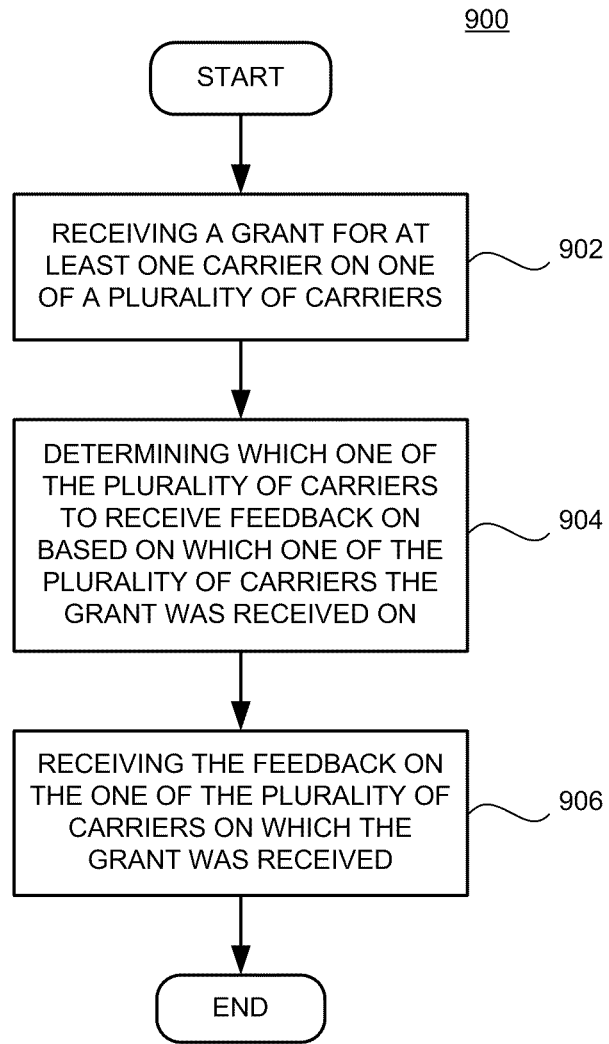
FIG. 9 is a flow chart illustrating an example of a process for controlling reception of feedback in an asymmetric multicarrier communications system.

FIG. 9 is a flow chart illustrating an example of a process for controlling reception of feedback in an asymmetric multicarrier communications system. The process may be implemented in the access terminals 120 of system 100. As shown in FIG. 9, in block 902, a grant may be received for at least one carrier on one of a plurality of carriers, and the process may proceed to block 904. For example, the access terminal 120 may receive a multicarrier uplink grant from the base station 110 on one of the downlink carriers.

In block 904, a determination may be made as to which one of the plurality of carriers to receive feedback on based on which one of the plurality of carriers the grant was received on, and the process may proceed to block 906. For example, the access terminal 120 may determine which downlink carrier to receive feedback on based on where the uplink carrier was received.

In block 906, feedback may be received on the one of the plurality of carriers on which the grant was received, and the process may end. For example, the access terminal 120 may receive HARQ feedback on the downlink carrier where the uplink grant was previously received.

Figure 10:
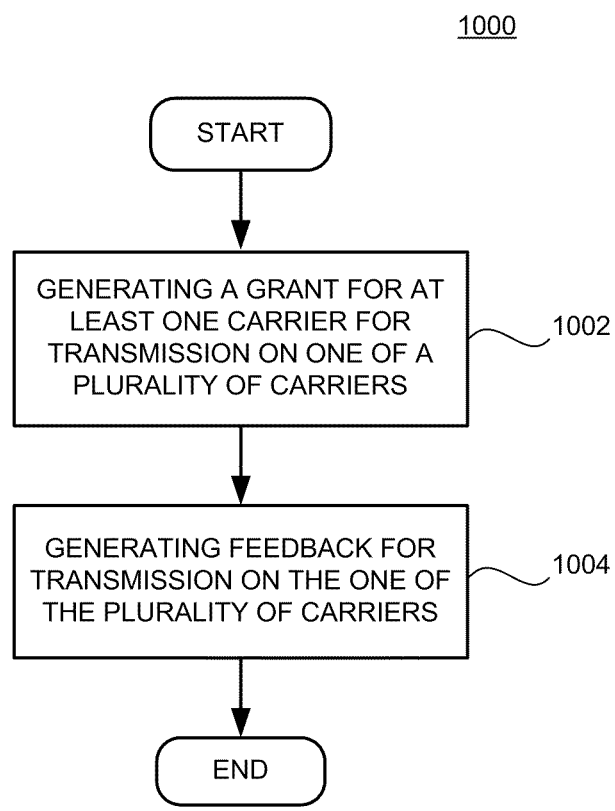
FIG. 10 is a flow chart illustrating an example of a process for controlling transmission of feedback in an asymmetric multicarrier communications system.

FIG. 10 is a flow chart illustrating an example of a process for controlling transmission of feedback in an asymmetric multicarrier communications system. The process may be implemented in the base station 110 of system 100. As shown in FIG. 10, in block 1002, a grant may be generated for transmission on one of a plurality of carriers, and the process may proceed to block 1004. For example, the base station 110 may generate and transmit a multicarrier uplink grant to the access terminal 120 on one of the downlink carriers.

In block 1004, feedback may be generated for transmission on the one of the plurality of carriers, and the process may end. For example, the base station 110 may generate HARQ feedback, determine which downlink carrier to transmit the feedback on based on where the uplink carrier was transmitted, and transmit the feedback to the respective access terminal 120 on the downlink carrier where the uplink grant was previously transmitted.

Figure 11:
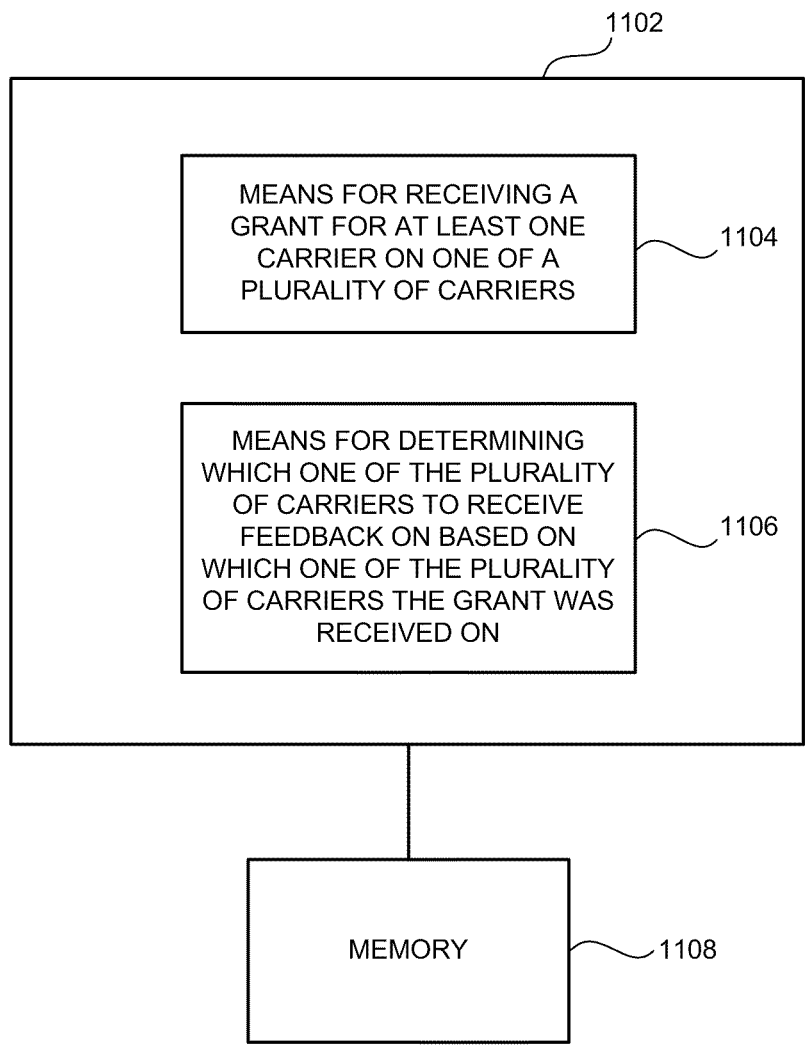
FIG. 11 is an illustration of an example system that controls reception of feedback in an asymmetric multicarrier communications system.

FIG. 11 is an illustration of an example system 1100 that controls reception of feedback in an asymmetric multicarrier communications system. For example, system 1100 can reside at least partially within an access terminal, etc. It is to be appreciated that system 1100 is represented as including functional blocks, which can be functional blocks that represent functions implemented by a processor, software, or combination thereof (e.g., firmware). System 1100 includes a logical grouping 1102 of means that can act in conjunction. For instance, logical grouping 1102 can include: means for receiving a grant for at least one carrier on one of a plurality of carriers 1104; and means for determining which one of the plurality of carriers to receive feedback on based on which one of the plurality of carriers the grant was received on 1106. Additionally, system 1100 can include a memory 1108 that retains instructions for executing functions associated with the means 1104 through 1106. While shown as being external to memory 1108, it is to be understood that one or more of the means 1104 through 1106 can exist within memory 1108.

Figure 12:
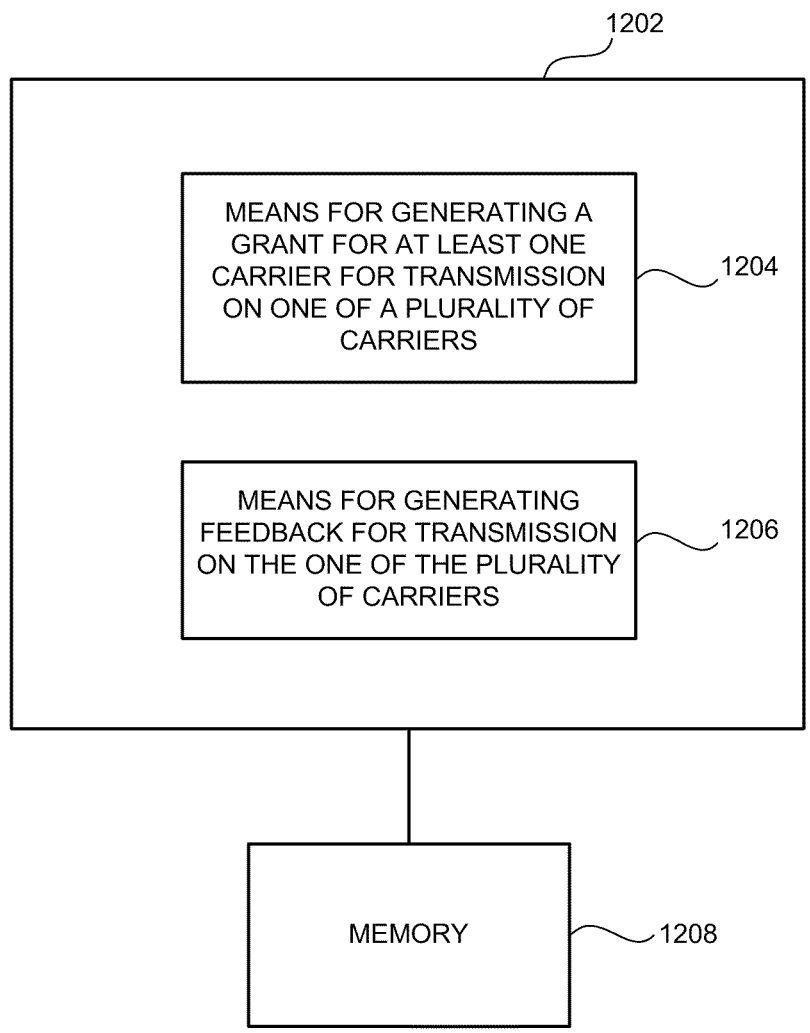
FIG. 12 is an illustration of an example system that controls transmission of feedback in an asymmetric multicarrier communications system.

FIG. 12 is an illustration of an example system 1200 that controls transmission of feedback in an asymmetric multicarrier communications system. For example, system 1200 can reside at least partially within a base station, etc. It is to be appreciated that system 1200 is represented as including functional blocks, which can be functional blocks that represent functions implemented by a processor, software, or combination thereof (e.g., firmware). System 1200 includes a logical grouping 1202 of means that can act in conjunction. For instance, logical grouping 1202 can include: means for generating a grant for at least one carrier for transmission on one of a plurality of carriers 1204; and means for generating feedback for transmission on the one of the plurality of carriers 1206. Additionally, system 1200 can include a memory 1208 that retains instructions for executing functions associated with the means 1204 through 1206. While shown as being external to memory 1208, it is to be understood that one or more of the means 1204 through 1206 can exist within memory 1208.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless communication apparatus, comprising:
a controller configured to:
reserve resources on a first downlink carrier to send feedback for a plurality of uplink carriers, the first downlink carrier being one of a plurality of downlink carriers, the plurality of uplink carriers including a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions received on uplink carriers, and wherein resources on a second downlink carrier corresponding to uplink resource blocks numbered 1 to $N_{RB2}$ are assigned to carry feedback for the second uplink carrier; and
reserve resource blocks numbered 1 to $N_{RB1}$ on the first downlink carrier for single-carrier access terminals and multi-carrier access terminals; and
a processor configured to:
generate an uplink grant for at least one uplink carrier for transmission on the first downlink carrier; and
generate feedback for transmission on the first downlink carrier, the feedback comprising indication of successful or unsuccessful decoding of data transmission received on the at least one uplink carrier.

2. The wireless communication apparatus of claim 1, wherein the controller is further configured to reserve resources for the single-carrier access terminals and the multi-carrier access terminals.

3. The wireless communication apparatus of claim 1, wherein the controller is further configured to transmit a plurality of uplink grants for the plurality of uplink carriers on the first downlink carrier.

4. The wireless communication apparatus of claim 1, wherein the uplink grant is a multicarrier uplink grant.

5. The wireless communication apparatus of claim 1, wherein resource blocks numbered $1+N_{RB1}$ to $N_{RB1}+N_{RB2}$ on the first downlink carrier are reserved for the multicarrier access terminals.

6. The wireless communication apparatus of claim 1, wherein resource blocks numbered 1 to $N_{RB2}$ on the second downlink carrier are reserved for the single carrier access terminals.

7. The wireless communication apparatus of claim 1, wherein resources on the first downlink carrier that correspond to uplink resource blocks of the at least one uplink carrier are assigned to carry feedback for the at least one uplink carrier.

8. A method for wireless communication, comprising:
reserving resources on a first downlink carrier to send feedback for a plurality of uplink carriers, the first downlink carrier being one of a plurality of downlink carriers, the plurality of uplink carriers including a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions received on uplink carriers, and wherein resources on a second downlink carrier corresponding to uplink resource blocks numbered 1 to $N_{RB2}$ are assigned to carry feedback for a the second uplink carrier;
reserving resource blocks numbered 1 to $N_{RB1}$ on the first downlink carrier for a single-carrier access terminals and multi-carrier access terminals;
generating an uplink grant for at least one uplink carrier for transmission on the first downlink carrier; and
generating feedback for transmission on the first downlink carrier, the feedback comprising indication of successful or unsuccessful decoding of data transmission received on the at least one uplink carrier.

9. The method of claim 8, wherein the reserving comprises reserving resources for the single-carrier access terminals and the multi-carrier access terminals.

10. The method of claim 8, further comprising transmitting a plurality of uplink grants for the plurality of uplink carriers on the first downlink carrier.

11. The method of claim 8, wherein the uplink grant is a multicarrier uplink grant.

12. The method of claim 8, wherein resource blocks numbered $1+N_{RB1}$ to $N_{RB1}+N_{RB2}$ on the first downlink carrier are reserved for the multicarrier access terminals.

13. The method of claim 8, wherein resource blocks numbered 1 to $N_{RB2}$ on the second downlink carrier are reserved for the single carrier access terminals.

14. The method of claim 8, wherein resources on the first downlink carrier that correspond to uplink resource blocks of the at least one uplink carrier are assigned to carry feedback for the at least one uplink carrier.

15. An apparatus comprising:
  means for reserving resources on a first downlink carrier to send feedback for a plurality of uplink carriers, the first downlink carrier being one of a plurality of downlink carriers, the plurality of uplink carriers including a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions received on uplink carriers, and wherein resources on a second downlink carrier corresponding to uplink resource blocks numbered 1 to $N_{RB2}$ are assigned to carry feedback for the second uplink carrier;
  means for reserving resource blocks numbered 1 to $N_{RB1}$ on the first downlink carrier for single-carrier access terminals and multi-carrier access terminals;
  means for generating an uplink grant for at least one uplink carrier for transmission on the first downlink carrier; and
  means for generating feedback for transmission on the first downlink carrier, the feedback comprising indication of successful or unsuccessful decoding of data transmission received on the at least one uplink carrier.

16. The apparatus of claim 15, further comprising means for reserving resources for the single-carrier access terminals and the multi-carrier access terminals.

17. The apparatus of claim 15, further comprising means for transmitting a plurality of uplink grants for the plurality of uplink carriers on the first downlink carrier.

18. The apparatus of claim 15, wherein the uplink grant is a multicarrier uplink grant.

19. The apparatus of claim 15, wherein resource blocks numbered $1+N_{RB1}$ to $N_{RB1}+N_{RB2}$ on the second downlink carrier are reserved for the multicarrier access terminals.

20. The apparatus of claim 15, wherein resource blocks numbered 1 to $N_{RB2}$ on the second downlink carrier are reserved for the single carrier access terminals.

21. The apparatus of claim 15, wherein resources on the first downlink carrier that correspond to uplink resource blocks of the at least one uplink carrier are assigned to carry feedback for the at least one uplink carrier.

22. A computer program product, comprising:
  a non-transitory computer-readable medium comprising:
    code for reserving resources on a first downlink carrier to send feedback for a plurality of uplink carriers, the first downlink carrier being one of a plurality of downlink carriers, the plurality of uplink carriers including a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions received on uplink carriers, and wherein resources on a second downlink carrier corresponding to uplink resource blocks numbered 1 to $N_{RB2}$ are assigned to carry feedback for the second uplink carrier;
    code for reserving resource blocks numbered 1 to $N_{RB1}$ on the first downlink carrier for single-carrier access terminals and multi-carrier access terminals;
    code for generating an uplink grant for at least one uplink carrier for transmission on the first downlink carrier; and
    code for generating feedback for transmission on the first downlink carrier, the feedback comprising indication of successful or unsuccessful decoding of data transmission received on the at least one uplink carrier.

23. The computer program product of claim 22, wherein the computer-readable medium further comprises code for reserving resources for the single-carrier access terminals and the multi-carrier access terminals.

24. The computer program product of claim 22 wherein the computer-readable medium further comprises code for transmitting a plurality of uplink grants for the plurality of uplink carriers on the first downlink carrier.

25. The computer program product of claim 22, wherein uplink grant is a multicarrier uplink grant.

26. The computer program product of claim 22, wherein resource blocks numbered $1+N_{RB1}$ to $N_{RB1}+N_{RB2}$ on the first downlink carrier are reserved for the multicarrier access terminals.

27. The computer program product of claim 22, wherein resource blocks numbered 1 to $N_{RB2}$ on the second downlink carrier are reserved for the single carrier access terminals.

28. The computer program product of claim 22, wherein resources on the first downlink carrier that correspond to uplink resource blocks of the at least one uplink carrier are assigned to carry feedback for the at least one uplink carrier.

29. A wireless communication apparatus, comprising:
  a controller configured to:
    receive an uplink grant for at least one uplink carrier on a first downlink carrier among a plurality of downlink carriers; and
  a processor configured to:
    receive feedback on the first downlink carrier, the feedback comprising indication of successful or unsuccessful decoding of data transmission sent on the at least one uplink carrier, wherein resources on the first downlink carrier are reserved to send feedback for a plurality of uplink carriers, wherein the plurality of uplink carriers include a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions sent on uplink carriers, wherein resources on a second downlink carrier corresponding to uplink resource blocks numbered 1 to $N_{RB2}$ are assigned to carry feedback for the second uplink carrier, and wherein resource blocks numbered 1 to $N_{RB1}$ on the first downlink carrier are reserved for single-carrier access terminals and multi-carrier access terminals.

30. The wireless communication apparatus of claim 29, wherein PHICH resources are reserved for Long Term Evolution (LTE) and LTE-Advanced access terminals.

31. The wireless communication apparatus of claim 29, wherein resources are reserved for the single-carrier access terminals and the multi-carrier access terminals.

32. The wireless communication apparatus of claim 29, wherein the uplink grant is a multicarrier uplink grant.

33. The wireless communication apparatus of claim 29, wherein resource blocks numbered $1+N_{RB1}$ to $N_{RB1}+N_{RB2}$ on the first downlink carrier are reserved for the multicarrier access terminals.

34. The wireless communication apparatus of claim 29, wherein resource blocks numbered 1 to $N_{RB2}$ on the second downlink carrier are reserved for the single carrier access terminals.

35. The wireless communication apparatus of claim 29, wherein resources on the first downlink carrier that correspond to uplink resource blocks of the at least one uplink carrier are assigned to carry feedback for the at least one uplink carrier.

36. A method for wireless communication, comprising:
receiving an uplink grant for at least one uplink carrier on a first downlink carrier among a plurality of downlink carriers; and
receiving feedback on the first downlink carrier, the feedback comprising indication of successful or unsuccessful decoding of data transmission sent on the at least one uplink carrier,
wherein resources on the first downlink carrier are reserved to send feedback for a plurality of uplink carriers, wherein the plurality of uplink carriers include a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions sent on uplink carriers, wherein resources on a second downlink carrier corresponding to uplink resource blocks numbered 1 to $N_{RB2}$ are assigned to carry feedback for the second uplink carrier, and wherein resource blocks numbered 1 to $N_{RB1}$ on the first downlink carrier are reserved for single-carrier access terminals and multi-carrier access terminals.

37. The method of claim 36, wherein resources are reserved for the single-carrier access terminals and the multi-carrier access terminals.

38. The method of claim 36, further comprising receiving a plurality of uplink grants for the plurality of uplink carriers on the first downlink carrier.

39. The method of claim 36, wherein the uplink grant is a multicarrier uplink grant.

40. The method of claim 36, wherein resource blocks numbered $1+N_{RB1}$ to $N_{RB1}+N_{RB2}$ on the first downlink carrier are reserved for the multicarrier access terminals.

41. The method of claim 36, wherein resource blocks numbered 1 to $N_{RB2}$ on the second downlink carrier are reserved for the single carrier access terminals.

42. The method of claim 36 wherein resources on the first downlink carrier that correspond to uplink resource blocks of the at least one uplink carrier are assigned to carry feedback for the at least one uplink carrier.

43. An apparatus comprising:
means for receiving an uplink grant for at least one uplink carrier on a first downlink carrier among a plurality of downlink carriers; and
means for receiving feedback on the first downlink carrier, the feedback comprising indication of successful or unsuccessful decoding of data transmission sent on the at least one uplink carrier,
wherein resources on the first downlink carrier are reserved to send feedback for a plurality of uplink carriers, wherein the plurality of uplink carriers include a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions sent on uplink carriers, wherein resources on a second downlink carrier corresponding to uplink resource blocks numbered 1 to $N_{RB2}$ are assigned to carry feedback for the second uplink carrier, and wherein resource blocks numbered 1 to $N_{RB1}$ on the first downlink carrier are reserved for single-carrier access terminals and multi-carrier access terminals.

44. The apparatus of claim 43, wherein resources are reserved for the single-carrier access terminals and the multi-carrier access terminals.

45. The apparatus of claim 43, further comprising means for receiving a plurality of uplink grants for the plurality of uplink carriers on the first downlink carrier.

46. The apparatus of claim 43, wherein the uplink grant is a multicarrier uplink grant.

47. The apparatus of claim 43, wherein resource blocks numbered $1+N_{RB1}$ to $N_{RB1}+N_{RB2}$ on the first downlink carrier are reserved for the multicarrier access terminals.

48. The apparatus of claim 43, wherein resource blocks numbered 1 to $N_{RB2}$ on the second downlink carrier are reserved for the single carrier access terminals.

49. The apparatus of claim 43, wherein resources on the first downlink carrier that correspond to uplink resource blocks of the at least one uplink carrier are assigned to carry feedback for the at least one uplink carrier.

50. A computer program product, comprising:
a non-transitory computer-readable medium comprising:
  code for receiving an uplink grant for at least one uplink carrier on a first downlink carrier among a plurality of downlink carriers; and
  code for receiving feedback on the first downlink carrier, the feedback comprising indication of a successful or unsuccessful decoding of data transmission sent on the at least one uplink carrier,
wherein resources on the fist downlink carrier are reserved to send feedback for a plurality of uplink carriers, wherein the plurality of uplink carriers include a first uplink carrier comprising $N_{RB1}$ uplink resource blocks and a second uplink carrier comprising $N_{RB2}$ uplink resource blocks, wherein reserved resources on the first downlink carrier corresponding to uplink resource blocks numbered 1 to $N_{RB1}$ are assigned to carry feedback for the first uplink carrier, wherein reserved resources on the first downlink carrier corresponding to uplink resource blocks numbered $N_{RB1}+1$ to $N_{RB1}+N_{RB2}$ are assigned to carry feedback for the second uplink carrier, wherein the reserved resources comprise resource elements corresponding to a physical channel that provides indication of successful or unsuccessful decoding of data transmissions sent on uplink carriers, wherein resources on a second downlink carrier corresponding to uplink resource blocks numbered 1 to $N_{RB2}$ are assigned to carry feedback for the second uplink carrier, and wherein resource blocks numbered 1 to $N_{RB1}$ on the first downlink carrier are reserved for single-carrier access terminals and multi-carrier access terminals.

51. The computer program product of claim 50, wherein resources are reserved for the single-carrier access terminals and the multi-carrier access terminals.

52. The computer program product of claim 50, wherein the computer-readable medium further comprises code for receiving a plurality of uplink grants for the plurality of uplink carriers on the first downlink carrier.

53. The computer program product of claim 50, wherein the uplink grant is a multicarrier uplink grant.

54. The computer program product of claim 50, wherein resource blocks numbered $1+N_{RB1}$ to $N_{RB1}+N_{RB2}$ on the first downlink carrier are reserved for the multicarrier access terminals.

55. The computer program product of claim 50, wherein resource blocks numbered 1 to $N_{RB2}$ on the second downlink carrier are reserved for the single carrier access terminals.

56. The computer program product of claim 50, wherein resources on the first downlink carrier that correspond to uplink resource blocks of the at least one uplink carrier are assigned to carry feedback for the at least one uplink carrier.

* * * * *